US010232308B2

(12) United States Patent
Shimohira et al.

(10) Patent No.: US 10,232,308 B2
(45) Date of Patent: Mar. 19, 2019

(54) METHOD AND DEVICE FOR WET FLUE-GAS DESULFURIZATION

(71) Applicant: MITSUBISHI HITACHI POWER SYSTEMS, LTD., Yokohama-shi, Kanagawa (JP)

(72) Inventors: Wakako Shimohira, Yokohama (JP); Hirofumi Kikkawa, Yokohama (JP); Atsushi Katagawa, Yokohama (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 0 days.

(21) Appl. No.: 15/558,360

(22) PCT Filed: Apr. 1, 2016

(86) PCT No.: PCT/JP2016/060922
§ 371 (c)(1),
(2) Date: Sep. 14, 2017

(87) PCT Pub. No.: WO2016/163318
PCT Pub. Date: Oct. 13, 2016

(65) Prior Publication Data
US 2018/0093220 A1    Apr. 5, 2018

(30) Foreign Application Priority Data

Apr. 9, 2015    (JP) .................................. 2015-080299

(51) Int. Cl.
*B01D 53/14*    (2006.01)
*B01D 53/18*    (2006.01)
(Continued)

(52) U.S. Cl.
CPC .......... *B01D 53/1481* (2013.01); *B01D 53/14* (2013.01); *B01D 53/1412* (2013.01);
(Continued)

(58) Field of Classification Search
CPC ............ B01D 53/1481; B01D 53/1412; B01D 53/1418; B01D 53/185; B01D 53/504;
(Continued)

(56) References Cited

U.S. PATENT DOCUMENTS 6,090,355 A *    7/2000    Winkler ................. B01D 53/10
                                                       422/168
2015/0265965 A1    9/2015    Yoshimoto et al.

FOREIGN PATENT DOCUMENTS

| JP | 2009-61450 A | 3/2009 |
| JP | 2013-202434 A | 10/2013 |
| JP | 2014-124580 A | 7/2014 |

OTHER PUBLICATIONS

Kikkawa et al., "Highly-Efficient Removal of Toxic Trace Elements and Particulate Matter in Flue Gas Emitted from Coal-fired Power Plants by Air Quality Control System (AQCS)", Mitsubishi Heavy Industries Technical Review, Apr. 28, 2015, vol. 52, No. 2, pp. 94-100, cited in ISR, w/English translation (15 pages).

(Continued)

*Primary Examiner* — Timothy C Vanoy
(74) *Attorney, Agent, or Firm* — Westerman, Hattori, Daniels & Adrian, LLP (57) ABSTRACT

In order to heighten the recovery of activated carbon by separation in a flotation device and stably inhibit mercury from being re-emitted in a desulfurization/absorption tower and from coming into gypsum to be recovered, a method is provided, the method comprising: adding activated carbon to an absorption liquid to be sprayed into the desulfurization/absorption tower to thereby remove mercury components from the flue gas simultaneously with desulfurization of the flue gas; sending the absorption liquid used for the desulfurization to the flotation device to thereby form a foam bubble layer; reducing the drainage volume so that the physical properties of the bubble layer are within given (Continued)

ranges, in such an amount that the concentration of chlorine ions in the absorption liquid does not exceed a given value; and simultaneously adding Ca and/or Mg ions and a frothing agent to the absorption liquid.

10 Claims, 7 Drawing Sheets (51) Int. Cl.
    *B01D 53/50* (2006.01)
    *B01D 53/64* (2006.01)
    *B03D 1/02* (2006.01)
    *B03D 1/08* (2006.01)
    *B01D 53/78* (2006.01)
    *B03D 1/14* (2006.01)
    *B03D 1/24* (2006.01)
    *C02F 1/24* (2006.01)
    *C02F 1/28* (2006.01)

(52) U.S. Cl.
    CPC ....... *B01D 53/1418* (2013.01); *B01D 53/185* (2013.01); *B01D 53/50* (2013.01); *B01D 53/504* (2013.01); *B01D 53/64* (2013.01); *B01D 53/78* (2013.01); *B03D 1/02* (2013.01); *B03D 1/028* (2013.01); *B03D 1/08* (2013.01); *B03D 1/14* (2013.01); *B03D 1/24* (2013.01); *C02F 1/24* (2013.01); *C02F 1/28* (2013.01); *B01D 2251/402* (2013.01); *B01D 2251/404* (2013.01)

(58) Field of Classification Search
    CPC .............. B01D 53/64; B01D 2251/402; B01D 2251/404; B01D 2257/302; B01D 2257/602; B01D 2258/0283; B01D 53/50; B01D 53/78; B03D 1/028; B03D 1/08
    See application file for complete search history.

(56) References Cited

OTHER PUBLICATIONS

International Search Report dated Jun. 28, 2016, issued in counterpart application No. PCT/JP2016/060922. (2 pages).

* cited by examiner

METHOD AND DEVICE FOR WET FLUE-GAS DESULFURIZATION

TECHNICAL FIELD

The present invention relates to an exhaust gas treatment device and an exhaust gas treatment method of a thermal power generation boiler, and more particularly, to a technique intended to reduce a mercury emission from a device for wet flue-gas desulfurization at the time of exhaust gas treatment.

BACKGROUND ART

Figure 8:
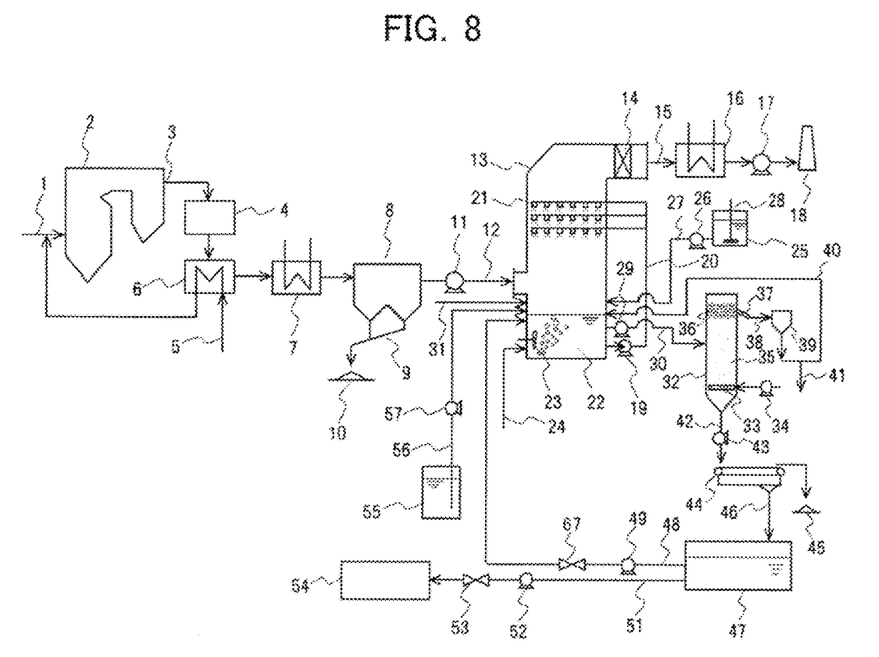
FIG. 8 is a flow chart illustrating an exhaust gas treatment flow of a thermal power generation boiler and a limestone-gypsum wet desulfurization system in the related art.

Mercury concentration in coal is only at a ppb level and a mercury component exists in a trace amount, but the mercury is emitted to the atmosphere by combustion of the coal and may affect health and the environment, therefore, the mercury should be removed as much as possible from the boiler exhaust gas. FIG. 8A illustrates a flow of exhaust gas treatment of a pulverized coal fired boiler such as a thermal power plant in the related art.

A high-temperature exhaust gas exceeding 1600° C. generated by burning pulverized coal 1 in a boiler furnace 2 reaches 1200 to 1300° C. in the vicinity of an outlet of the boiler furnace 2, and the temperature is decreased to about 400° C. at an outlet 3 of a convection zone of the boiler furnace 2. The exhaust gas discharged from the outlet 3 of the convection zone is subjected to removal of nitrogen oxides (hereinafter occasionally referred to as NOx) by a denitration catalyst filled tank 4 disposed in an exhaust gas flow passage, and is cooled via an air preheater 6 that preheats a combustion air 5 and a heat exchanger (heat recovery unit) 7, and then most fly ash is removed by an electrostatic precipitator (EP) 8 set at about 100 to 200° C. A fly ash 10 discharged from a bottom of the electrostatic precipitator 8 through an ash extraction line 9 is subjected to landfill disposal or sold as a cement raw material, or the like according to properties thereof. The exhaust gas discharged from the electrostatic precipitator 8 is introduced into a wet desulfurization device (desulfurization/absorption tower) 13 by a fan 11 and a desulfurization inlet line 12, and is subjected to removal of sulfur oxides (hereinafter, occasionally referred to as $SO_2$). The desulfurized exhaust gas passes through a mist eliminator 14 to remove scattered mists, and is sent from a desulfurization outlet line 15 to a heat exchanger (reheating unit) 16 to be heated above a dew point, and then is emitted to the atmosphere from a stack 18.

Mercury contained in the coal is vaporized due to a high temperature inside the boiler furnace 2 and becomes a metallic mercury state, but thereafter, is changed to oxidized mercury according to an action of a denitration catalyst and a decrease in the exhaust gas temperature. Apart of oxidized mercury is not only removed from the exhaust gas by the electrostatic precipitator 8 with being caught in fly ash particles, but also dissolved and removed in the desulfurization/absorption liquid in the wet desulfurization device 13, since the oxidized mercury is water-soluble. In recent years, a denitration catalyst having a high mercury oxidation rate has become commercially available, and by applying this catalyst, an amount of mercury dissolved in a wet desulfurization liquid is increased, whereby it is possible to reduce the amount of mercury component emitted from the stack 18 to the atmosphere.

There are various desulfurization methods available in the wet desulfurization device (a desulfurization/absorption tower) 13, however the wet desulfurization method of a limestone-gypsum method illustrated in FIG. 8 is one of the methods with the highest removal efficiency of $SO_2$, and is an excellent technique in which the gypsum of a by-product can be effectively used as a cement material or the like.

A boiler exhaust gas containing $SO_2$ of several hundreds to several thousands ppm introduced into a desulfurization device 13 from the desulfurization inlet line 12 rises in the tower of the desulfurization device 13. Opposite thereto, a slurry of limestone, (main component: calcium carbonate ($CaCO_3$)) contained in the desulfurization/absorption liquid which is collected in a circulation tank 22 at a lower portion of the desulfurization device 13 and is sent via a circulation line 20 by a desulfurization/absorption liquid circulation pump 19, is sprayed from spray nozzles 21 as an absorption liquid to become fine liquid drops. The liquid drop-shaped absorption liquid absorbs $SO_2$ by gas-liquid contact with the exhaust gas to generate calcium sulfite ($CaSO_3$) as shown in the following equation, thereby efficiently removing $SO_2$ from the exhaust gas. At this time, the oxidized mercury in the exhaust gas is also simultaneously dissolved and removed in the absorption liquid.

$$CaCO_3 + SO_2 + \tfrac{1}{2}H_2O \rightarrow CaSO_3 \cdot \tfrac{1}{2}H_2O + CO_2$$

The absorption liquid dropped in the desulfurization device 13 is collected in the circulation tank 22. The absorption liquid in the circulation tank 22 is stirred by a stirrer 23 at all times, and the calcium sulfite is oxidized by oxygen contained in the air supplied from the air supply line 24 as shown in the following equation to generate crystals of calcium sulfate ($CaSO_4$: gypsum).

$$CaSO_3 \cdot \tfrac{1}{2}H_2O + \tfrac{1}{2}O_2 + \tfrac{3}{2}H_2O \rightarrow CaSO_4 \cdot 2H_2O$$

As the concentration of calcium sulfite is decreased from the absorption liquid by oxidation, it is possible to newly absorb $SO_2$, such that the desulfurization efficiency becomes better as the oxidation rate is increased.

It is better for the oxidizing efficiency of sulfurous acid when the pH is low. Meanwhile, if the absorption liquid absorbs $SO_2$, the pH thereof is decreased to reduce $SO_2$ absorbability. However, the absorption efficiency of $SO_2$ may be improved when the pH is high, that is, the concentration of $CaCO_3$ which is alkaline is high. Therefore, in order to satisfy both of the $SO_2$ absorption and the sulfurous acid oxidation, new limestone slurry is supplied from a limestone slurry tank 25 to the circulation tank 22 by a slurry pump 26 and a limestone slurry supply line 27 so that the pH of the absorption liquid is in a range of 5 to 6.

The limestone slurry is prepared by mixing fine powders of limestone and water. The slurry inside of the slurry tank 25 is stirred by a stirrer 28 at all times in order to prevent limestone particles from being settled. The limestone concentration of the limestone slurry in the limestone slurry supply line 27 is usually 20 to 40 percent by weight (wt. %).

A large amount of generated gypsum particles is contained in the absorption liquid in the circulation tank 22. However, by extracting a part of the absorption liquid from an extraction line 30 by an extraction pump 29, the device is usually operated so that the gypsum concentration remains constant within a range of 10 to 30 wt. %. As this will be described below, by dehydrating the extracted absorption liquid, the gypsum is recovered as a by-product that can be effectively used.

If the oxidized mercury dissolved in the liquid is condensed to be a high concentration by circulation of the absorption liquid, the mercury may be re-emitted, and the concentration of mercury in the exhaust gas emitted from the desulfurization device may be increased. Depending on an oxidation state of the absorption liquid, the mercury with a high concentration is often introduced into gypsum crystals. If the concentration of the mercury in the recovered gypsum is increased, there is a problem in terms of effectively using the gypsum. On the other hand, powdered activated carbon is supplied from an activated carbon supply line 31 to the wet desulfurization device 13 to be mixed with the desulfurization/absorption liquid, and the mercury dissolved in the desulfurization/absorption liquid is adsorbed and removed, thereby the mercury concentration in the solution may be suppressed to a low level, as well as re-emission and migration of the mercury to the gypsum may be suppressed.

As a specific method, absorption liquid containing activated carbon after adsorbing mercury and gypsum generated by a desulfurization reaction is extracted from the circulation tank 22 by the extraction pump 29 and the extraction line 30, and is continuously introduced into a foam type flotation device 32. The foam type flotation device 32 generates a large volume of bubbles by supplying air to a gas disperser 33 installed in the vicinity of a bottom thereof by using a pump 34. Since the gypsum is hydrophilic, it is mostly adhered to the bubbles and remains in a dispersed bubble layer 35 under a liquid surface without rising, but since the activated carbon has carbon which is hydrophobic as a main component, it is adhered to the fine bubbles rising from the bottom to further rise, and is collected in the foam bubble layer 36 formed on the liquid surface in a condensed state. As a result, the concentration of the activated carbon in the liquid of the dispersed bubble layer 35 is decreased. Bubbles containing the activated carbon in a high concentration in the foam bubble layer 36 are continuously overflowed from the bubble discharge port 37 provided at an upper portion of the liquid surface, and are recovered by the bubble recovery line 38. The recovered bubbles are damaged by a foam breaker 39 and become a liquid containing activated carbon in a high concentration (referred to as an overflow liquid).

A part of the recovered high concentration activated carbon overflow liquid is returned to the desulfurization device 13 by an activated carbon return line 40 and reused for adsorption of mercury. The remaining part thereof is discharged from the discharge line 41 to outside the system, and is subjected to final disposal such as mercury fixing or mercury recovery. However, since the gypsum content is small, disposal efficiency is good. At the same time, in order to compensate for the amount of activated carbon discharged to outside the system, new activated carbon is supplied to the desulfurization device 13 from the activated carbon supply line 31.

On the other hand, an extraction line 42 is connected to a bottom of the dispersed bubble layer 35 of the flotation device 32, and the absorption liquid having a low activated carbon concentration and high gypsum concentration is extracted by the extraction pump 43. The extracted absorption liquid is dehydrated by a dehydrator (belt filter or the like) 44 to recover the dehydrated gypsum 45. Since the concentration of the activated carbon in the absorption liquid at the bottom of the dispersed bubble layer 35 is low, the obtained dehydrated gypsum has a low mercury content, and becomes a safe material with a high product value without decreased whiteness.

The recovered water after dehydration is stored in a recovery water tank 47 via a line 46. A part of the recovered water is extracted from the recovered water return line 48 by a pump 49, returned to the circulation tank 22 through an on-off valve 67, and reused as makeup water. Depending on the plant, the recovered water may be used for other purposes such as regulated water of limestone slurry. In addition, the remaining part of the recovered water is sent from the drainage line 51 to a drainage treatment equipment 54 through the pump 52 and the on-off valve 53, and is finally treated and then discharged to a river or the sea.

Figure 3:
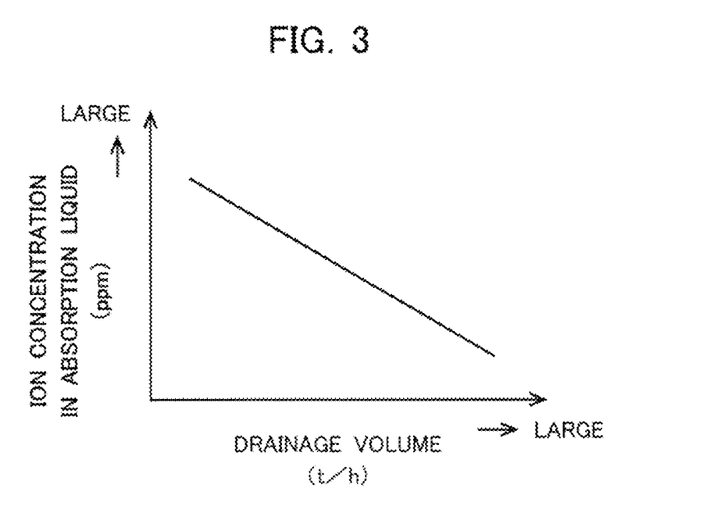
FIG. 3 is a graph conceptually illustrating a relationship between the drainage volume in a desulfurization equipment and an ion concentration in an absorption liquid.

The amount of dehydrated gypsum 45 to be recovered is adjusted so as to be balanced with the amount of gypsum generated by a reaction of $SO_2$ flowing into the desulfurization device 13 and the limestone. In addition, a part of the recovered water is sent to the drainage treatment equipment 54 and discharged to outside the system. Therefore, in order to constantly maintain a liquid level in the circulation tank 22, an amount of the industrial water or the like prepared in a water tank 55 is supplied to the circulation tank 22 by a new replenish water line 56 and a pump 57, such that a concentration degree of the desulfurization/absorption liquid is changed by increasing or decreasing the drainage volume. That is, as illustrated in FIG. 3, the concentration of various ions dissolved in the absorption liquid becomes higher as the drainage volume is lowered. When the concentration of chloride ions in the absorption liquid is too high, the desulfurization performance is decreased, thereby the drainage volume is usually controlled so that the chlorine concentration becomes a predetermined value (for example, 10,000 ppm) or less.

In the above-described prior art illustrated in FIG. 8, there are problems as follows.

Generally, as the bubbles supplied from the bottom are fine, flotation separability of the activated carbon in the flotation device 32 is further improved. Even with the same gas supply amount and the same gas disperser 33, diameters of the generated bubbles vary depending on a composition of a liquid. Therefore, depending on the composition of the absorption liquid, failure occurs in the flotation and separation of the activated carbon, and a recovery rate of the activated carbon due to overflow may be decreased.

The liquid composition mentioned herein is mainly a type and a concentration of the dissolved ions, and the composition of the desulfurization/absorption liquid varies for each plant depending on the type of fuel coal, the type of limestone, properties of water, and operating conditions. Further, even in the same plant, if the properties of the coal, limestone, and water are changed, the composition of the liquid may vary.

If failure occurs in the flotation and separation of the activated carbon in the flotation device 32, the concentration of the activated carbon in the absorption liquid extracted from the bottom is high, but briefly, the activated carbon adsorbing a large amount of mercury is contained in the dehydrated gypsum in a high concentration, thereby causing a problem in effective utilization. In addition, since the activated carbon is black, the whiteness of the recovered gypsum is reduced, and a commercial value thereof may be reduced. On the other hand, if the concentration of the activated carbon in the overflow liquid is reduced, the amount of the activated carbon returned to the desulfurization/absorption tower 13 is decreased, such that the amount of newly supplied activated carbon should be increased, and is therefore uneconomical.

Generally, there may be hydrocycloning as a separation method having a comparatively small influence of the liquid composition on the separability of the solid matter in the absorption liquid. Patent Document 1 (Japanese Unexamined Patent Application Publication No. 2009-61450) discloses a method in which a mercury component in a flue-gas comes into contact with an absorption reagent (a scrubbing solution containing an adsorbent such as activated carbon), thereby the mercury component in the flue-gas is absorbed to the absorption reagent, then gypsum is separated from a desulfurizing liquid by using a hydrocyclone, and the obtained suspension (the adsorption reagent, that is, the activated carbon is present) comes into contact with an oxidation reagent to desorb the activated carbon and the mercury component, thereby removing the mercury compound in the flue-gas. At this time, the activated carbon is separated and removed on an overflow side.

Figure 9:
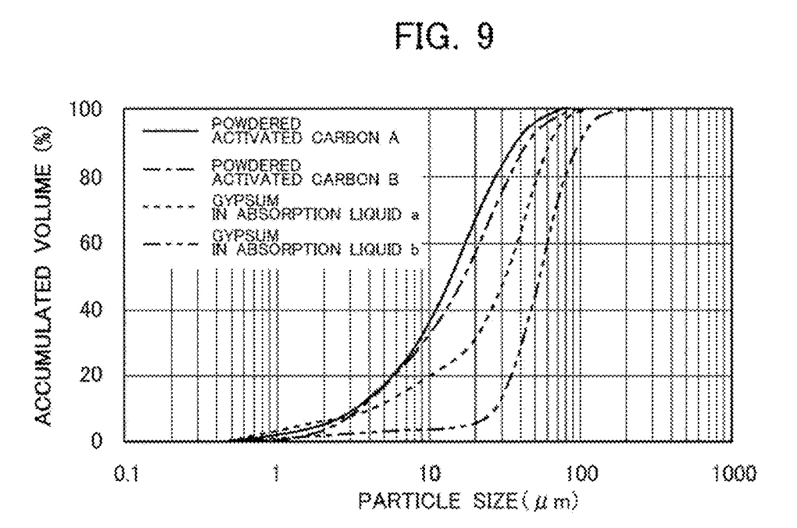
FIG. 9 is a graph illustrating an example of a particle size distribution of powdered activated carbon and gypsum in the desulfurization/absorption liquid.

However, as illustrated in FIG. 9, a particle size distribution (solid line and broken line) of powdered activated carbon (with an average particle size of 17 to 19 μm) is finer than that of gypsum in the absorption liquid (dotted line and one-dot chain line), and a particle size range in which the distributions are overlapped is fairly wide. Therefore, the separability of the hydrocyclone is unsatisfactory, and a fairly large amount of the activated carbon is distributed on an underflow side, and mercury is contained in the recovered gypsum. Meanwhile, a part of the activated carbon discharged to the overflow side should be extracted to outside the system and finally disposed of in a form in which the mercury is not eluted. However, since the overflow simultaneously contains a large amount of gypsum, there are problems such as an increase in a final disposal amount.

PRIOR ART DOCUMENT

Patent Document

[Patent Document 1] Japanese Unexamined Patent Application Publication No. 2009-61450

SUMMARY OF INVENTION

Technical Problem

In consideration of the above-mentioned circumstances, it is an object of the present invention to provide a method and a device for flue-gas desulfurization which may stably reduce a mercury concentration in a recovered gypsum while preventing mercury from being re-emitted from a desulfurization/absorption liquid, as well as may reduce an amount of mercury-containing solid content to be finally disposed.

Solution to Problem

The above object is achieved by the following methods.

A first aspect of the present invention provides a method for wet flue-gas desulfurization in which an exhaust gas discharged from a combustion device including a boiler is introduced into a desulfurization/absorption tower (13), and a slurry-like absorption liquid prepared by mixing crushed limestone and water into the desulfurization/absorption tower (13) is sprayed from spray nozzles (21) to bring it into contact with the exhaust gas, thus to absorb and remove sulfur oxide in the exhaust gas into the absorption liquid, and the fallen absorption liquid is stored in a circulation tank (22), while circulating the absorption liquid in the circulation tank (22) and supplying to the spray nozzles (21) so as to repeatedly use the same, a part of the absorption liquid is extracted from the circulation tank (22) and is subjected to solid-liquid separation, thus to recover gypsum generated in the absorption liquid by a desulfurization reaction due to limestone, the method for wet flue-gas desulfurization including: supplying powdered activated carbon to the desulfurization/absorption tower (13) to adsorb and remove mercury in the absorption liquid; extracting a part of the absorption liquid from the circulation tank (22) and supplying it to a foam type flotation device (32) which generates a large amount of fine bubbles; recovering a floating foam bubble layer (36) formed on a liquid surface of the absorption liquid of the foam type flotation device (32) to return a part thereof to the desulfurization/absorption tower (13), and disposing the remaining, as well as, dehydrating the absorption liquid extracted from a lower portion of the foam type flotation device (32) to recover the gypsum; flowing a part of the absorption liquid after recovering the gypsum into a drainage system and circulating the other part to the circulation tank (22); and adjusting a drainage volume of the absorption liquid flowing in the drainage system after recovering the gypsum, adjusting a circulation amount of the absorption liquid after recovering the gypsum to the circulation tank (22), and/or adjusting an addition amount of a water-soluble additive containing calcium (Ca) and/or magnesium (Mg) to the absorption liquid in the foam type flotation device (32), so that physical property values of the foam bubble layer (36) of the foam type flotation device (32) are in a predetermined range.

A second aspect of the present invention provides the method for wet flue-gas desulfurization according to the first aspect of the present invention, wherein the physical property value of the foam bubble layer (36) of the foam type flotation device (32) is any one or more of whiteness, brightness, and luminance of the absorption liquid recovered by the foam type flotation device (32).

A third aspect of the present invention provides the method for wet flue-gas desulfurization according to the first aspect of the present invention, wherein the physical property value of the foam bubble layer (36) of the foam type flotation device (32) is a height of the foam bubble layer (36).

A fourth aspect of the present invention provides the method for wet flue-gas desulfurization according to the first aspect of the present invention, further including: adjusting an addition amount of the frothing agent to be added to the absorption liquid in the foam type flotation device (32), together with the steps of adjusting the drainage volume of the absorption liquid flowing in the drainage system, adjusting the circulation amount of the absorption liquid to the circulation tank (22) after recovering the gypsum, and/or adjusting the addition amount of the water-soluble additive containing Ca and/or Mg to the absorption liquid in the foam type flotation device (32).

A fifth aspect of the present invention provides the method for wet flue-gas desulfurization according to the first aspect of the present invention, wherein the steps of adjusting the drainage volume of the absorption liquid flowing in the drainage system, adjusting the circulation amount of the absorption liquid to the circulation tank (22) after recovering the gypsum, adjusting the addition amount of the water-soluble additive containing Ca and/or Mg to the absorption liquid in the foam type flotation device (32), and/or adjusting the addition amount of the frothing agent to be added to the absorption liquid in the foam type flotation device (32) are performed, while maintaining a concentration of chloride (Cl) ions in the absorption liquid at an outlet of the foam type flotation device (32) or the absorption liquid extracted from the circulation tank (22) of the desulfurization/absorption tower (13) so as not to exceed a predetermined value.

A sixth aspect of the present invention provides a device for wet flue-gas desulfurization including: a desulfurization/absorption tower (13) configured to introduce an exhaust gas discharged from a combustion device including a boiler and bring it into contact with an absorption liquid sprayed from spray nozzles (21) to perform desulfurization; a circulation tank (22) provided in a lower portion of the desulfurization/absorption tower (13) to store the absorption liquid; an absorption liquid circulation path (20) configured to circulate and supply the absorption liquid in the circulation tank (22) to the spray nozzles (21) provided in the desulfurization/absorption tower (13); a powdered activated carbon supply unit (31) configured to supply powdered activated carbon to the desulfurization/absorption tower (13); a foam type flotation device (32) to which a part of the absorption liquid in the circulation tank (22) is supplied; an absorption liquid return path (48) with a returned absorption liquid flow control valve (67) configured to recover a floating foam bubble layer (36) formed on a liquid level of the foam type flotation device (32) and return a part thereof to the desulfurization/absorption tower (13); an absorption liquid extraction flow passage (42) provided at a lower portion of the foam type flotation device (32); a dehydrator (44) configured to dehydrate the absorption liquid containing gypsum extracted from the absorption liquid extraction flow passage (42) to separate the gypsum; a drainage path (51) with a drainage flow control valve (65) configured to drain the absorption liquid dehydrated by the dehydrator (44); a drainage treatment equipment (54) connected to a drain passage (51); an additive supply flow passage (72) with an additive supply device (70) and an additive supply amount control valve (74) configured to add an additive containing water-soluble Ca and/or Mg compounds to the absorption liquid recovered by the foam type flotation device (32) or the absorption liquid in the desulfurization/absorption tower (13); a sensor (61) configured to measure physical property values of the foam bubble layer (36) of the foam type flotation device (32); and an arithmetic controller (63) configured to control at least one or more of an opening degree of the returned absorption liquid flow control valve (67) configured to control an absorption liquid amount of the return path (48) returned to the desulfurization/absorption tower (13), an opening degree of the drainage flow control valve (65) configured to control a drainage volume to the drainage treatment equipment (54), and an opening degree of the additive supply amount control valve (74) of the additive supply flow passage (72), so that the physical property values of the foam bubble layer (36) measured by the sensor (61) are in a predetermined range.

A seventh aspect of the present invention provides the device for wet flue-gas desulfurization according to the sixth aspect of the present invention, wherein the sensor (61) configured to measure the physical property values of the foam bubble layer (36) of the foam type flotation device (32) is a sensor configured to detect any one or more of whiteness, brightness, and luminance of the absorption liquid recovered by the foam type flotation device (32).

An eighth aspect of the present invention provides the device for wet flue-gas desulfurization according to the sixth aspect of the present invention, wherein the sensor (61) configured to measure the physical property values of the foam bubble layer (36) of the foam type flotation device (32) is a level meter configured to detect a height of the foam bubble layer (36).

A ninth aspect of the present invention provides the device for wet flue-gas desulfurization according to the sixth aspect of the present invention, further including: a frothing agent supply flow passage (77) with a frothing agent tank (75) and a frothing agent supply amount control valve (78) configured to add a frothing agent to the absorption liquid in the foam type flotation device (32) by a pump (76) from the frothing agent tank (75); and an arithmetic controller (63) configured to control at least one or more of the opening degree of the returned absorption liquid flow control valve (67) configured to control the absorption liquid amount of the return path (48) returned to the desulfurization/absorption tower (13), the opening degree of the drainage flow control valve (65) configured to control the drainage volume to the drainage treatment equipment (54), an opening degree of a water-soluble additive (containing Ca and/or Mg) supply amount control valve (74), and an opening degree of a frothing agent supply amount control valve (78) of the frothing agent supply flow passage (77).

A tenth aspect of the present invention provides the device for wet flue-gas desulfurization according to the sixth aspect of the present invention, further including: a chlorine ion concentration meter (68) configured to measure a concentration of Cl ions, which is provided in the absorption liquid extraction flow passage (42) at the lower portion of the foam type flotation device (32) or in the absorption liquid circulation path (20) configured to circulate and supply the absorption liquid to the spray nozzles (21) provided in the desulfurization/absorption tower (13); and an arithmetic controller (63) configured to control any one or more of the opening degree of the returned absorption liquid flow control valve (67) configured to control the absorption liquid amount of the return path (48), the opening degree of the drainage flow control valve (65) configured to control the drainage volume to the drainage treatment equipment (54), an opening degree of a water-soluble additive (containing Ca and/or Mg) supply amount control valve (74), and an opening degree of the frothing agent supply amount control valve (78), while ensuring that the measured value of the chlorine ion concentration meter (68) does not exceed a predetermined value.

As described above, in the present invention, a cation concentration in the absorption liquid is adjusted so that the physical property value of a foamy layer formed on an upper portion of the flotation device is in a predetermined range. Specifically, for example, blackness or whiteness (brightness) of an overflow liquid is digitized, and when the blackness becomes below the predetermined value or when the brightness exceeds the predetermined value, it is determined that separability of the activated carbon is in a failure state. Alternatively, the height of the foamy layer is measured, and when the level thereof becomes below a predetermined value, it is determined that the separability of the activated carbon is in a failure state. Then, when it is determined that the separability is in the failure state, the drainage volume is decreased within a range in which the concentration of chlorine (Cl) ions in the absorption liquid to be separately measured does not exceed the predetermined value, or a water-soluble Ca and/or Mg compound is added to the absorption liquid as an additive, and in some cases, further, a commercially available frothing agent for flotation (for example, pine oil, 4-methyl-1,2-pentanol) is controlled so as to be added to the absorption liquid. Thereby, a recovery rate of the activated carbon by separation in the flotation device may be improved, and mercury re-emission and mercury migration to the recovered gypsum in the desulfurization device 13 may be stably suppressed.

(Operation)

According to the present invention, since the ion concentration in the desulfurization/absorption liquid can be maintained under a condition in which the activated carbon is stably floated and separated in the flotation device 32, it is possible to improve the recovery rate of the activated carbon due to overflow and reduce an amount in which the activated carbon after adsorbing mercury is mixed in the recovered gypsum.

Figure 4A:
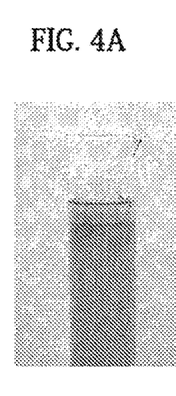
FIG. 4A to FIG. 4D are photographs experimentally illustrating compositions of a desulfurization/absorption liquid with respect to flotation separability of activated carbon in a flotation device.

FIG. 4A to FIG. 4D show results that experimentally confirm the influence of the cation concentration contained in the desulfurization/absorption liquid to the separation state of activated carbon in flotation. FIG. 4A shows a condition in which powdered activated carbon is added to the absorption liquid collected from the desulfurization/absorption tower of an actual device to which an addition of the activated carbon is not subjected, and gas is supplied from the bottom. In this absorption liquid, since the concentration of cations such as Ca and/or Mg is low, a color of the foamy layer in the vicinity of a liquid surface is light, and separation and concentration of the activated carbon is in a failure state.

Figure 4B:
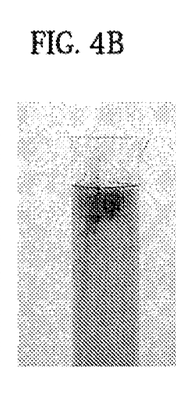
Figure 4C:
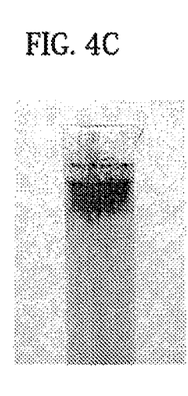
Figure 4D:
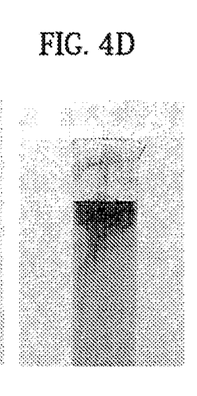

On the other hand, FIG. 4B, FIG. 4C, and FIG. 4D show a case in which concentrations of Ca and Mg ions in a liquid are increased by adding water-soluble Ca and Mg compounds, respectively, but in all cases, it can be seen that the blackness of the foamy layer in the vicinity of the liquid surface is increased, and the separability of the activated carbon is improved. In addition, it is confirmed that Mg ions are more effective than Ca ions so long as they have the same addition amount (number of moles) as each other, and that when adding a sodium compound as another cation, there is no effect.

However, as illustrated in FIG. 4A the desulfurization/absorption liquids of all plants do not always have a low cation concentration. The type of ions dissolved in the absorption liquid is mainly determined by the type of coal, the type of limestone, and the composition of water, however, as illustrated in FIG. 3, the concentration of each ion in the liquid is determined by a concentration degree of the absorption liquid which is changed depending on the drainage volume and the replenish water volume. That is, an adjustment of the ion concentration in the absorption liquid can be controlled in such a way that the ion concentration is increased if the replenish water volume is decreased by reducing the drainage volume without adding the Ca compound or the Mg compound, and on the other hand, the ion concentration is decreased if the replenish water volume is increased by increasing the drainage volume.

However, an absolute value of the concentration of Ca and/or Mg ions in the liquid does not actually influence the flotation separability of the activated carbon. It is confirmed that, even if the concentrations of Ca and/or Mg ions are about the same, the separability is changed due to the influence of unknown coexisting substance (not necessarily a dissolved substance).

Figure 5:
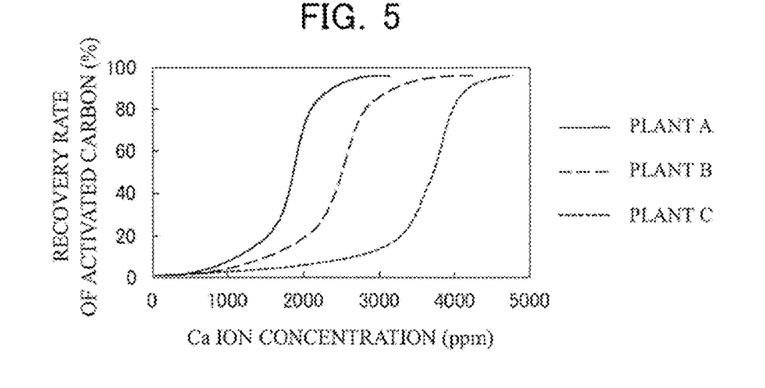
FIG. 5 is a graph conceptually illustrating a relationship between a concentration of Ca ions in the absorption liquid and a recovery rate of the activated carbon due to overflow of the flotation device.

Therefore, it is not possible to specify only the concentration of Ca and/or Mg ions that can maintain a separation performance, and by directly monitoring the concentration of Ca and/or Mg ions in the absorption liquid, the drainage volume is controlled so that their concentrations become a predetermined value, and thereby it is not possible to effectively separate the activated carbon in the desulfurization/absorption liquid. However, even when there are some coexisting substances that influence the separability of the activated carbon, as illustrated in FIG. 5, as the concentration of cations (mainly Ca and/or Mg) in the liquid is increased, a floating property of the activated carbon is relatively improved to increase the recovery rate. As a result, a control of increasing the concentration of Ca and/or Mg ions so as to improve the actual separability is effective.

In addition, when continuously measuring the cation concentration, an on-line type calcium ion meter is commercially available, but a magnesium ion meter is only in the research and development stage, and thereby it is not practically used.

Therefore, in the present invention, whether or not the activated carbon is sufficiently separated is determined by directly monitoring physical properties of the foamy layer in the flotation and separation state thereof in the flotation device, and when the separability is deteriorated, a means, in which (a) the concentration of Ca and/or Mg ions in the absorption liquid is increased by decreasing the drainage volume so as to condense the desulfurization/absorption liquid, (b) the concentration of Ca and/or Mg ions in the absorption liquid is increased by increasing a circulation amount of the absorption liquid returned to the circulation tank of the desulfurization device, and/or (c) the ion concentration is adjusted by adding a water-soluble Ca compound or a Mg compound to the absorption liquid, is employed.

Figure 6:
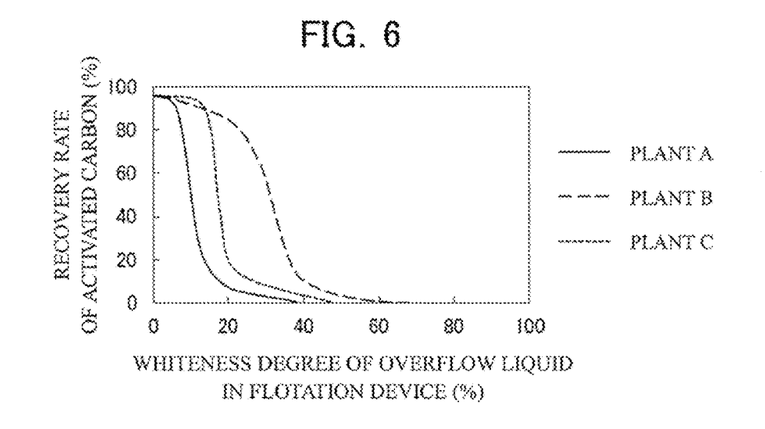
FIG. 6 is a graph illustrating an example of a relationship between a whiteness degree of the overflow liquid in the flotation device and the recovery rate of the activated carbon due to the overflow.
Figure 7:
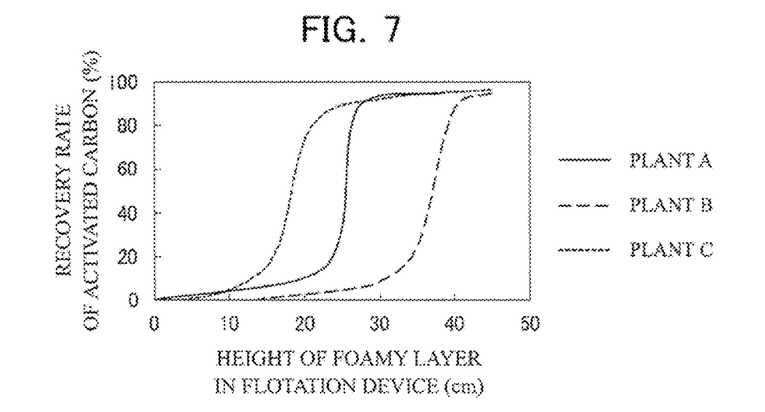
FIG. 7 is a graph illustrating an example of the relationship between a height of a foamy layer in the flotation device and the recovery rate of the activated carbon due to the overflow.

When the whiteness (whiteness degree) of the overflow liquid is digitized as physical property values of the specific foamy layer, as illustrated in FIG. 6, as the liquid color is close to the black side, the recovery rate of the activated carbon is increased. Thereby, when the blackness becomes below the predetermined value or when the whiteness exceeds the predetermined value, it is determined that the separability of the activated carbon is in a failure state, and ion concentration adjustment control is performed. Alternatively, when measuring the height of the foamy layer, as illustrated in FIG. 7, as the level of the foamy layer is increased, the recovery rate of the activated carbon is increased. Thereby, when the level thereof becomes below the predetermined value, it is determined that the separability of the activated carbon is in a failure state, and the ion concentration adjustment control is performed.

As illustrated in FIG. 5, since it is not the "absolute value" of the concentration of Ca and/or Mg ions in the liquid that actually influences the flotation separability of the activated carbon, the recovery rate of the activated carbon differs depending on the (liquid composition for each) plant, even if the concentration of the calcium ions is the same.

In addition, since the degree of whiteness of the overflow liquid varies depending on the original color tone of the gypsum (varying by the plant) without addition of the activated carbon, even if the addition rate of the activated carbon is the same, it is not possible to put a universal scale between the recovery rate of the activated carbon and the degree of whiteness of the overflow liquid, and an example is merely illustrated in FIG. 6.

In addition, since a height of the foamy layer that provides a necessary separating performance varies depending on different sizes, liquid composition, and gas supply methods, etc., for each equipment, it is not possible to put the universal scale, and an example is merely illustrated in FIG. 7.

Thereby, in FIGS. 5, 6 and 7, numerical values are put as an example of three desulfurization plants (A, B and C), respectively. However, when the indices (the concentration of Ca ions, whiteness and height of the foamy layer) vary, varying the relative ranking of the desulfurization plants A, B and C is achieved.

However, when condensing of the absorption liquid is performed, not only the Ca and/or Mg ions dissolved in the liquid are condensed, but also all ions are similarly condensed. If a concentration of Cl ions in the absorption liquid becomes too high, the desulfurization performance is reduced, such that the absorption liquid should be condensed within a range in which the chlorine concentration does not exceed a predetermined value (generally about 10,000 ppm).

Since the concentration of Cl in liquid can be monitored with a commercially available chlorine ion meter, the concentration of Cl in the absorption liquid is constantly monitored, and as a result of condensing of the absorption liquid, when the chlorine concentration is likely to exceed the predetermined value before the concentration of Ca and/or Mg ions reaches the predetermined value, by adding a water-soluble Ca compound which does not contain Cl (such as calcium nitrate), or a Mg compound (such as magnesium sulfate) to the absorption liquid without further performing the condensing, it is possible to increase the concentration of Ca and/or Mg ions in the liquid, and improve the recovery rate of the activated carbon by separation.

Advantageous Effects of Invention

In accordance with the first and sixth aspects of the present invention, regardless of differences in the plant and/or coal, limestone, and water, by (a) adjusting the drainage volume of the absorption liquid flowing in the drainage system after recovering the gypsum, and/or (b) adjusting the circulation amount of the absorption liquid after recovering the gypsum to the circulation tank 22, and/or (c) adding water-soluble Ca and/or Mg compounds to the absorption liquid to adjust the concentration of Ca and/or Mg ions in the absorption liquid recovered by the foam type flotation device 32 and the absorption liquid in the desulfurization/absorption tower 13, the separability of the activated carbon floating in the foam type flotation device 32 is improved.

Further, in accordance with the first and the sixth aspects of the present invention, since the conditions in which the activated carbon stably floats and is separated in the foam type flotation device 32 can be maintained, it is possible to improve the recovery rate of the activated carbon due to the overflow of the foam type flotation device 32, reduce the amount in which the activated carbon after adsorbing mercury is mixed in the recovered gypsum, and simultaneously reduce a re-emitted amount of mercury and a migrated amount of mercury to the recovered gypsum.

At this time, since a removal amount of metals other than mercury which acts as an oxidation catalyst in the desulfurization/absorption liquid by the activated carbon is small, there is no adverse effect on an oxidation efficiency of sulfurous acid and a desulfurization efficiency. As a result, it is possible to stabilize an emission amount of mercury from a stack at a low level while maintaining a high desulfurization rate of the exhaust gas. Further, since the amount of the activated carbon mixed into the recovered dehydrated gypsum is decreased, the mercury content of the recovered gypsum is reduced, and reducing of whiteness is also suppressed, thereby it is possible to improve the safety and commercial value of the gypsum. On the other hand, since the amount of gypsum mixed into the recovered activated carbon is significantly small, it is possible to greatly reduce the final drainage disposal volume after treatment of the desulfurization/absorption liquid.

In accordance with the second and seventh aspects of the present invention, in addition to the effects of the inventions according to the first and sixth aspects of the present invention, respectively, since any one or more of the whiteness, brightness, and luminance of the absorption liquid recovered as an overflow from the foam bubble layer 36 of the foam type flotation device 32 is an index of a separation performance of the absorption liquid of the activated carbon after adsorbing mercury in the foam type flotation device 32, it is also possible to reduce a ratio in which a mercury component is mixed in the recovered gypsum.

In accordance with the third and eighth aspects of the present invention, in addition to the effects of the inventions according to the first and sixth aspects of the present invention, respectively, since the height of the foam bubble layer 36 of the foam type flotation device 32 is an index of the separation performance of the absorption liquid of the activated carbon after adsorbing mercury in the foam type flotation device 32, it is also possible to reduce the ratio in which the mercury component is mixed in the recovered gypsum.

In accordance with the fourth and ninth aspects of the present invention, in addition to the effects of the inventions according to the first and sixth aspects of the present invention, respectively, when the flotation separability of the activated carbon is not further improved, even if controlling the drainage volume and adjusting the circulation amount of the absorption liquid to the circulation tank 22, and/or adjusting the ion concentration by addition of the Ca and/or Mg compounds, pine oil, 4-methyl-1,2-pentanol (alternative name: methyl isobutyl carbinol) and the like, which are commercially available frothing agents for flotation, are added. Since these frothing agents are organic substances, treatment may be required in a subsequent drainage treatment, but as compared with the addition of the frothing agent without adjusting the ion concentration of the absorption liquid, since the effects can be obtained with a small addition amount, the used amount of the frothing agent can be minimized.

In accordance with the fifth and tenth aspects of the present invention, in addition to the effects of the inventions according to the first and sixth aspects of the present invention, respectively, by making the concentration of Cl ions of the absorption liquid extracted from the lower portion of the foam type flotation device 32 not exceed the predetermined value, it is possible to enhance the separability of the activated carbon from the absorption liquid, and as a result, the mercury component in the absorption liquid can be advantageously separated.

DESCRIPTION OF EMBODIMENTS

Example 1

Figure 1:
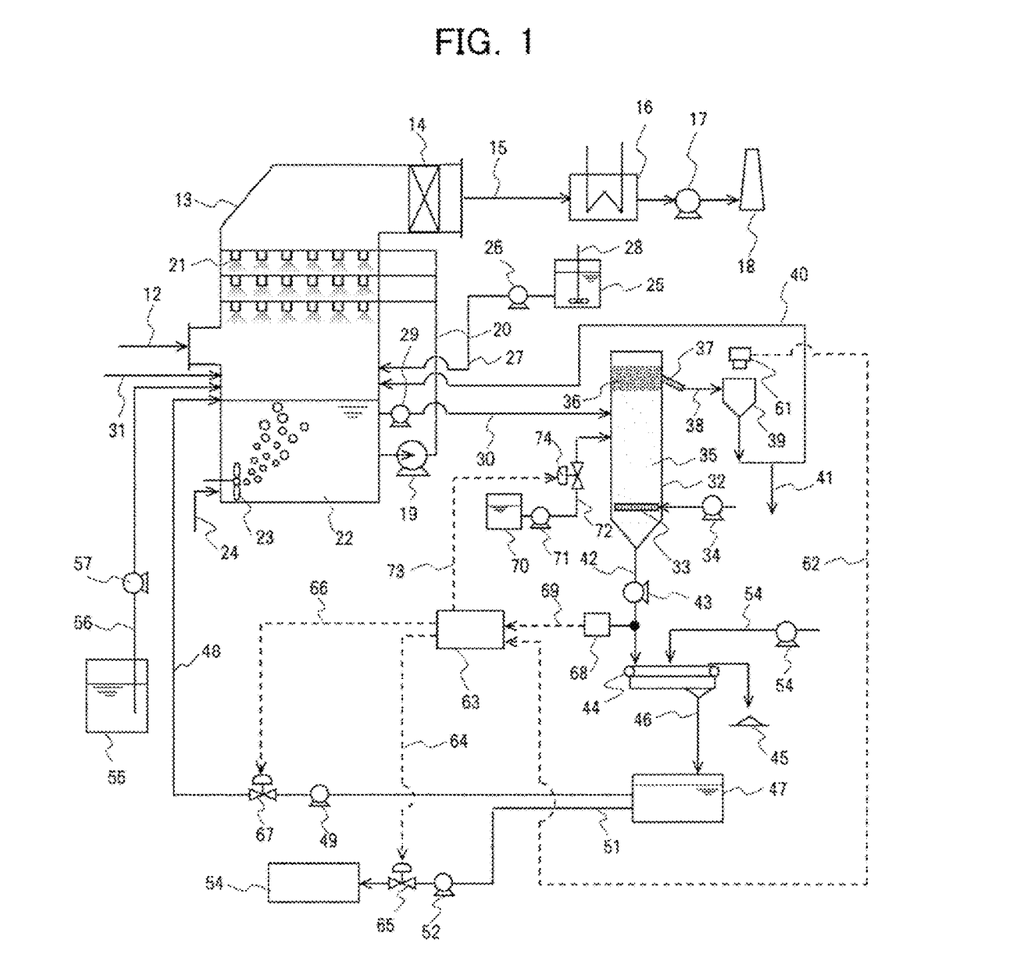
FIG. 1 is a flow chart illustrating an embodiment of a limestone-gypsum wet desulfurization according to the present invention.

An embodiment of the present invention will be described with reference to FIG. 1. The configuration and operation common to the related art are the same as the above description, therefore the corresponding portions will not be described.

A color or brightness of a slurry containing activated carbon overflowed from an upper portion of the flotation device 32 to a foam breaker 39 in a high concentration is continuously monitored by a noncontact type sensor 61. A type of the sensor 61 is not particularly limited as long as it can digitize blackness such as color, brightness, reflectance and the like. A sensor installation place is not particularly limited as long as it is a place in which an overflow liquid can be observed, but because contamination of a window is affected due to interference of an observation window, it is preferable that it is an open place so as to allow direct monitoring of a surface of the liquid, and the sensor is installed on a top of the foam breaker 39 in FIG. 1.

Data on the liquid surface measured by the sensor 61 is transmitted to an arithmetic controller 63 via a signal line 62. When results thereof are nearer to white than a predetermined value or a brightness is high, it is determined that the flotation separability of the activated carbon is deteriorated, and an opening degree of a control valve 65 is reduced via a signal line 64 according to an instruction from the arithmetic controller 63, such that the drainage volume sent to a drainage treatment equipment 54 is reduced in a range in which the concentration of Cl ions in an absorption liquid does not exceed the predetermined value. At the same time, according to the instruction from the arithmetic controller 63, the opening degree of the control valve 67 of the recovered water return line 48 is increased via a signal line 66 to increase a return amount of the recovered water returned to a circulation tank 22 of a desulfurization tower 13. As a result, a level of concentration of the absorption liquid is increased, and concentrations of Ca and/or Mg ions in the liquid are increased, whereby flotation separability of the activated carbon in the flotation device 32 is improved.

On the other hand, a chlorine ion concentration meter 68 is installed in a line 42 for extracting a gypsum slurry from a bottom of the flotation device 32 to constantly monitor the concentration of Cl ions in the liquid. Data on the concentration of Cl ions is transmitted to the arithmetic controller 63 via a signal line 69. At this time, although a color of the overflow liquid of the flotation device 32 in the foam breaker 39 detected by the sensor 61 does not satisfy a predetermined blackness, when the concentration of Cl ions is likely to be higher than the predetermined value, opening and closing operations of the control valves 65 and 67 via the signal lines 64 and 66 are stopped, respectively.

However, there is no need to limit an object for measuring the concentration of Cl ions to the absorption liquid of the flotation device 32 as in the present embodiment. Even if measuring the concentration of Cl ions in the absorption liquid of a desulfurization device 13, the same control can be performed, and the chlorine ion concentration meter 68 may be installed in an absorption liquid extraction flow passage 42 at a lower portion of a foam type flotation device 32 or in a desulfurization liquid circulation line 20 of the desulfurization device 13.

Then, an aqueous solution which contains Ca ions and/or Mg ions while does not contain Cl prepared in an additive tank 70 is added to the flotation device 32 via an additive supply pump 71 and an additive supply line 72. An addition amount at this time is adjusted by changing the opening degree of a control valve 74 according to the instruction from the arithmetic controller 63 via the signal line 73, so that the blackness of the overflow liquid becomes a predetermined value or more.

Depending on a composition of the absorption liquid and/or operating conditions of the desulfurization equipment, even if the concentration of Cl ions in the absorption liquid has not reached an upper limit, and Cl ions and/or Mg ions are insufficient, condensing thereof may not be further performed. In such a case, as an additive, an aqueous solution which contains Ca and/or Mg including Cl can be used. However, as a result of using these additives, when the concentration of Cl in the absorption liquid is likely to exceed a specified value, there is a need to switch to an additive of Ca and/or Mg which does not contain Cl.

Example 2

In Example 1, the flotation and separation state of the activated carbon is determined based on the result of color or brightness of the overflow liquid of the flotation device 32 detected by the sensor 61, and the adjustment of the drainage volume, adjustment of the circulation amount of the absorption liquid to the circulation tank 22, and/or addition of Ca and/or Mg compounds were/was performed, but the object and means to be detected are not limited thereto.

In the present embodiment, a height of a foamy layer 36 formed on the upper portion of the flotation device 32 is measured by a level meter, data therefrom is transmitted to the arithmetic controller 63 via the signal line 62, and when the level becomes below the predetermined value, it is determined that the separability of the activated carbon is in a failure state, and similar to Example 1, an operation of the device is performed by adjusting the drainage volume flowing in a drainage system of the absorption liquid after recovering the gypsum, adjusting the circulation amount of the absorption liquid to the circulation tank after recovering the gypsum, and/or adjusting the addition amount of the water-soluble additive containing Ca and/or Mg to the absorption liquid in the foam type flotation device.

Example 3

Figure 2:
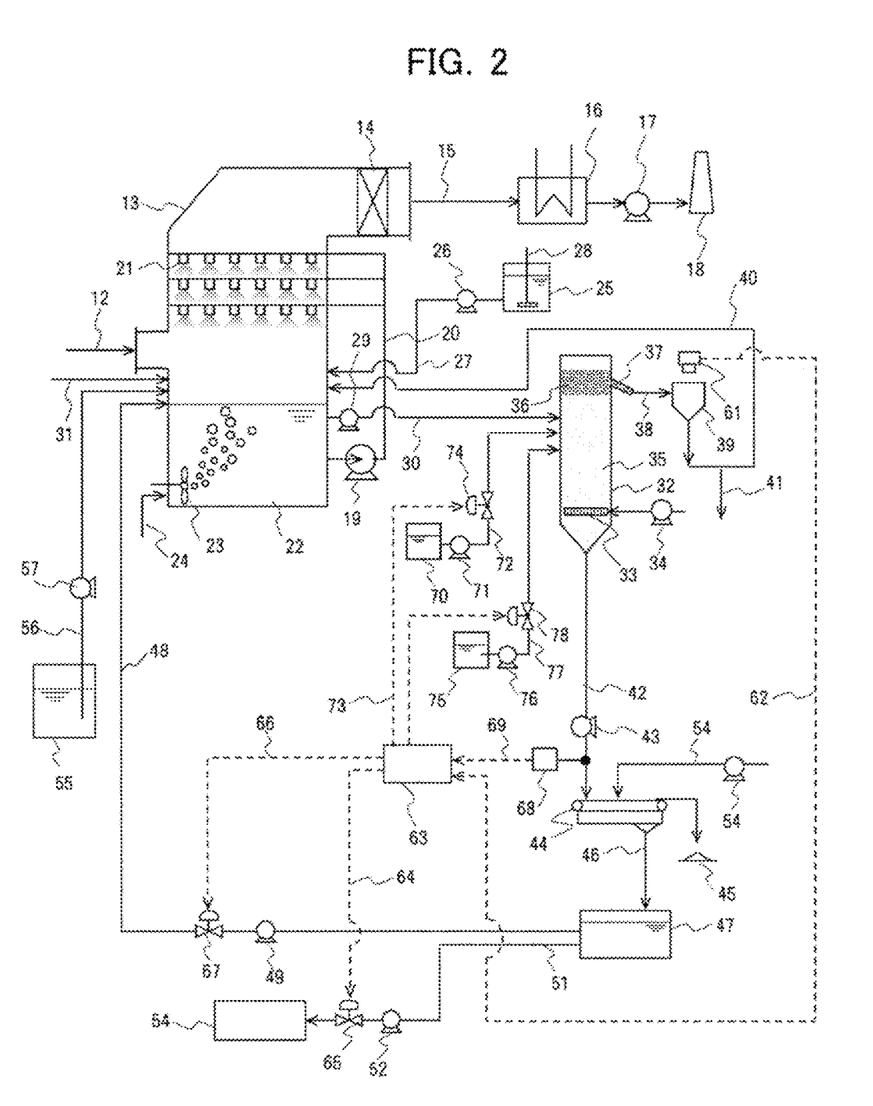
FIG. 2 is a flow chart illustrating another embodiment of the limestone-gypsum wet desulfurization according to the present invention.

In the above Examples 1 and 2, when the flotation separability of the activated carbon is not further improved, even if the ion concentration of the absorption liquid in the foam type flotation device 32 is adjusted by controlling the drainage volume and adjusting the circulation amount of the absorption liquid to the circulation tank 22, and/or adding the Ca and/or Mg compounds, as in the embodiment illustrated in FIG. 2 (having the same configuration as the configuration of FIG. 1 except for a frothing agent supply system), pine oil, 4-methyl-1,2-pentanol (alternative name: methyl isobutyl carbinol) and the like, which are commercially available frothing agents for flotation, are added from a frothing agent tank 75 to the foam type flotation device 32 through a frothing agent flow passage 77 by a pump 76 while adjusting a flow rate thereof by a frothing agent flow control valve 78. Since these frothing agents are organic substances, additional treatment may be required in a subsequent drainage treatment, but as compared with the addition of the frothing agent without adjusting the ion concentration of the absorption liquid, since the effects can be obtained with a small addition amount, the used amount of the frothing agent can be minimized.

DESCRIPTION OF REFERENCE NUMERALS

1 Coal supply line
12 Desulfurization inlet line
13 Wet desulfurization device (Desulfurization/absorption tower)
21 Spray nozzle
22 Circulation tank
44 Dehydrator
47 Recovery water tank
54 Drainage treatment equipment
70 Additive tank
72 Additive supply flow passage
74 Additive supply amount control valve
75 Frothing agent tank
77 Frothing agent supply flow passage
78 Frothing agent supply amount control valve

The invention claimed is:

1. A method for wet flue-gas desulfurization in which an exhaust gas discharged from a combustion device including a boiler is introduced into a desulfurization/absorption tower, and a slurry-like absorption liquid prepared by mixing crushed limestone and water into the desulfurization/absorption tower is sprayed from spray nozzles to bring it into contact with the exhaust gas, thus to absorb and remove sulfur oxide in the exhaust gas into the absorption liquid, and the fallen absorption liquid is stored in a circulation tank, while circulating the absorption liquid in the circulation tank and supplying to the spray nozzles so as to repeatedly use the same, a part of the absorption liquid is extracted from the circulation tank and is subjected to solid-liquid separation, thus to recover gypsum generated in the absorption liquid by a desulfurization reaction due to limestone, the method for wet flue-gas desulfurization comprising:
  supplying powdered activated carbon to the desulfurization/absorption tower to adsorb and remove mercury in the absorption liquid;
  extracting a part of the absorption liquid from the circulation tank and supplying it to a foam type flotation device which generates bubbles;
  recovering a floating foam bubble layer formed on a liquid surface of the absorption liquid of the foam type flotation device to return a part thereof to the desulfurization/absorption tower, and disposing the remaining, as well as, dehydrating the absorption liquid extracted from a lower portion of the foam type flotation device to recover the gypsum;
  flowing a part of the absorption liquid after recovering the gypsum into a drainage system and circulating the other part to the circulation tank; and
  adjusting a drainage volume of the absorption liquid flowing in the drainage system after recovering the gypsum, adjusting a circulation amount of the absorption liquid after recovering the gypsum to the circulation tank, and/or adjusting an addition amount of a water-soluble additive containing calcium (Ca) and/or magnesium (Mg) to the absorption liquid in the foam type flotation device, so that physical property values of the foam bubble layer of the foam type flotation device are in a predetermined range.

2. The method for wet flue-gas desulfurization according to claim 1, wherein the physical property value of the foam bubble layer of the foam type flotation device is any one or more of whiteness, brightness, and luminance of the absorption liquid recovered by the foam type flotation device.

3. The method for wet flue-gas desulfurization according to claim 1, wherein the physical property value of the foam bubble layer of the foam type flotation device is a height of the foam bubble layer.

4. The method for wet flue-gas desulfurization according to claim 1, further comprising: adjusting an addition amount of the frothing agent to be added to the absorption liquid in the foam type flotation device, together with the steps of adjusting the drainage volume of the absorption liquid flowing in the drainage system, adjusting the circulation amount of the absorption liquid to the circulation tank after recovering the gypsum, and/or adjusting the addition amount of the water-soluble additive containing Ca and/or Mg to the absorption liquid in the foam type flotation device.

5. The method for wet flue-gas desulfurization according to claim 1, wherein
  the steps of adjusting the drainage volume of the absorption liquid flowing in the drainage system, adjusting the circulation amount of the absorption liquid to the circulation tank after recovering the gypsum, adjusting the addition amount of the water-soluble additive containing Ca and/or Mg to the absorption liquid in the foam type flotation device, and/or adjusting the addition amount of the frothing agent to be added to the absorption liquid in the foam type flotation device are performed, while maintaining a concentration of chloride (Cl) ions in the absorption liquid at an outlet of the foam type flotation device or the absorption liquid extracted from the circulation tank of the desulfurization/absorption tower so as not to exceed a predetermined value.

6. A device for wet flue-gas desulfurization comprising:
  a desulfurization/absorption tower configured to introduce an exhaust gas discharged from a combustion device including a boiler and bring it into contact with an absorption liquid sprayed from spray nozzles to perform desulfurization;
  a circulation tank provided in a lower portion of the desulfurization/absorption tower to store the absorption liquid;
  an absorption liquid circulation path configured to circulate and supply the absorption liquid in the circulation tank to the spray nozzles provided in the desulfurization/absorption tower,
  a powdered activated carbon supply unit configured to supply powdered activated carbon to the desulfurization/absorption tower,
  a foam type flotation device to which a part of the absorption liquid in the circulation tank is supplied;
  an absorption liquid return path with a returned absorption liquid flow control valve configured to recover a floating foam bubble layer formed on a liquid level of the foam type flotation device and return a part thereof to the desulfurization/absorption tower,
  an absorption liquid extraction flow passage provided at a lower portion of the foam type flotation device;

a dehydrator configured to dehydrate the absorption liquid containing gypsum extracted from the absorption liquid extraction flow passage to separate the gypsum;

a drainage path with a drainage flow control valve configured to drain the absorption liquid dehydrated by the dehydrator;

a drainage treatment equipment connected to a drain passage;

an additive supply flow passage with an additive supply device and an additive supply amount control valve configured to add an additive containing water-soluble Ca and/or Mg compounds to the absorption liquid recovered by the foam type flotation device or the absorption liquid in the desulfurization/absorption tower, a sensor configured to measure physical property values of the foam bubble layer of the foam type flotation device; and an arithmetic controller configured to control at least one or more of an opening degree of the returned absorption liquid flow control valve configured to control an absorption liquid amount of the return path returned to the desulfurization/absorption tower, an opening degree of the drainage flow control valve configured to control a drainage volume to the drainage treatment equipment, and an opening degree of the additive supply amount control valve of the additive supply flow passage, so that the physical property values of the foam bubble layer measured by the sensor are in a predetermined range.

7. The device for wet flue-gas desulfurization according to claim 6, wherein the sensor configured to measure the physical property values of the foam bubble layer of the foam type flotation device is a sensor configured to detect any one or more of whiteness, brightness, and luminance of the absorption liquid recovered by the foam type flotation device.

8. The device for wet flue-gas desulfurization according to claim 6, wherein the sensor configured to measure the physical property values of the foam bubble layer of the foam type flotation device is a level meter configured to detect a height of the foam bubble layer.

9. The device for wet flue-gas desulfurization according to claim 6, further comprising:

a frothing agent supply flow passage with a frothing agent tank and a frothing agent supply amount control valve configured to add a frothing agent to the absorption liquid in the foam type flotation device by a pump from the frothing agent tank; and an arithmetic controller configured to control at least one or more of the opening degree of the returned absorption liquid flow control valve configured to control the absorption liquid amount of the return path returned to the desulfurization/absorption tower, the opening degree of the drainage flow control valve configured to control the drainage volume to the drainage treatment equipment, an opening degree of a water-soluble additive (containing Ca and/or Mg) supply amount control valve, and an opening degree of a frothing agent supply amount control valve of the frothing agent supply flow passage.

10. The device for wet flue-gas desulfurization according to claim 6, further comprising:

a chlorine ion concentration meter configured to measure a concentration of Cl ions, which is provided in the absorption liquid extraction flow passage at the lower portion of the foam type flotation device or in the absorption liquid circulation path configured to circulate and supply the absorption liquid to the spray nozzles provided in the desulfurization/absorption tower, and an arithmetic controller configured to control any one or more of the opening degree of the returned absorption liquid flow control valve configured to control the absorption liquid amount of the return path, the opening degree of the drainage flow control valve configured to control the drainage volume to the drainage treatment equipment, an opening degree of a water-soluble additive (containing Ca and/or Mg) supply amount control valve, and an opening degree of the frothing agent supply amount control valve, while ensuring that the measured value of the chlorine ion concentration meter does not exceed a predetermined value.

* * * * *